Sept. 10, 1929.  K. E. PORTER  1,728,007
COOKING UTENSIL
Filed June 8, 1928
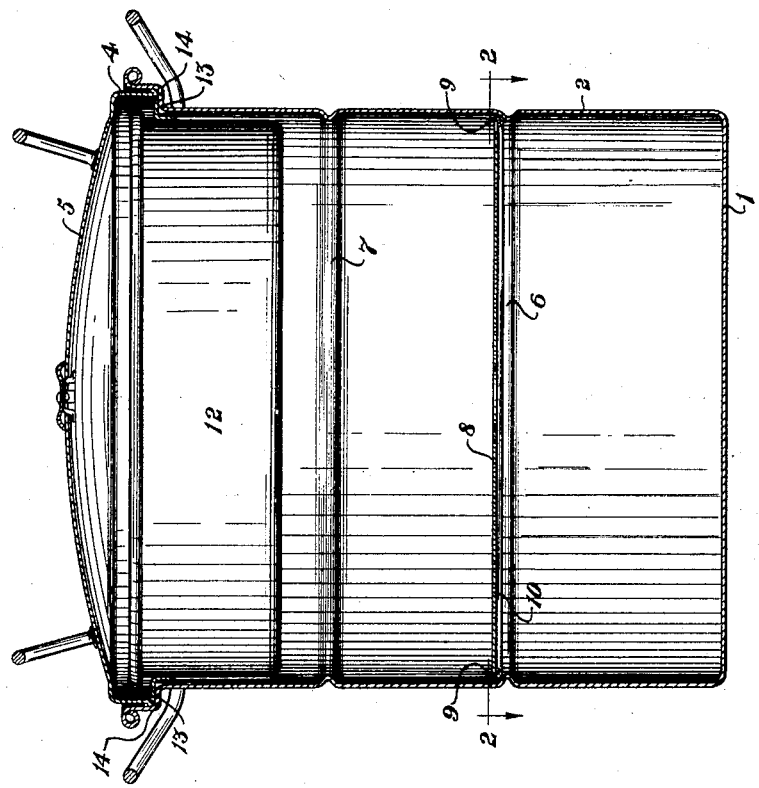
Fig. 1
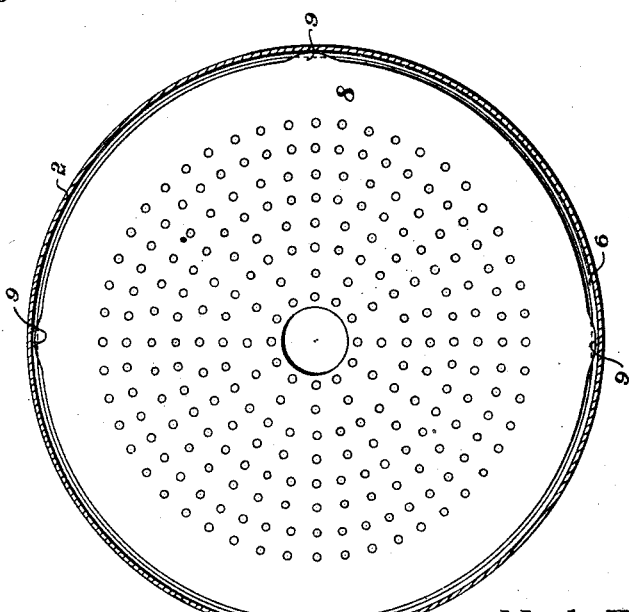
Fig. 2
Fig. 3
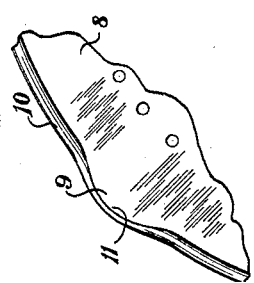
Inventor
Kirk E. Porter
By Harry Frease
Attorney Patented Sept. 10, 1929.

1,728,007

UNITED STATES PATENT OFFICE.

KIRK E. PORTER, OF WOOSTER, OHIO, ASSIGNOR TO THE BUCKEYE ALUMINUM COMPANY, OF WOOSTER, OHIO, A CORPORATION OF OHIO.

COOKING UTENSIL.

Application filed June 8, 1928. Serial No. 283,823.

The invention relates to cooking utensils and particularly to that type of utensil adapted for cooking foods without the use of water, the foods being placed in various compartments or receptacles within a steam-tight utensil and cooked in their own juices.

The object of the improvement is to provide a cooker having spaced annular ribs around its interior, a perforate shelf being arranged to be interchangeably mounted upon any one of said ribs and so constructed that it may be easily moved by one rib, when inserted in the cooker, to be seated upon a lower rib, and in the same manner to be moved by one or more ribs when removed from the cooker.

Such shelves are commonly provided with legs adapted to rest upon the bottom of the cooker, thus always spacing the shelf the same distance from the bottom. The improved construction to which the invention pertains permits the shelf to be located at different heights within the cooker and obviates the use of legs thereon.

The shelf may thus be placed at the desired height within the cooker and adapted to support suitable containers for food, or articles of food such as potatoes or the like may be placed directly upon the shelf while meat, soup or the like may be placed in the cooker below the shelf, suitable means being preferably provided for supporting another container within the top of the cooker independently of the shelf.

An embodiment of the invention is illustrated in the accompanying drawing, in which Figure 1 is a vertical sectional view of the improved cooker;

Fig. 2, a section on the line 2—2, Fig. 1; and

Fig. 3, a fragmentary detail view of a part of the under side of the perforated plate, showing one of the lugs in the periphery thereof.

Similar numerals refer to similar parts throughout the drawing.

The cooker may be substantially cylindrical in shape, having the bottom wall 1 and cylindric side wall 2, the upper edge of which may be formed in any suitable manner to provide a tight fit for the depending flange 4 of the cover 5.

Spaced annular ribs may be provided around the interior of the side wall, two of such ribs being shown at 6 and 7 in the drawing. The lower rib 6 is spaced a suitable distance above the bottom wall 1 of the cooker to permit a roast of meat or the like to be placed upon the bottom wall beneath said rib and the upper rib 7 may be spaced substantially the same distance above the lower rib.

The perforated shelf 8 is adapted to be supported upon either of the ribs 6 or 7 and is so constructed that it may be passed downward, within the cooker, by the upper rib 7 and supported upon the lower rib as shown in Figs. 1 and 2 or, if desired, may be so inserted within the cooker that it will be supported upon the upper rib.

The diameter of this perforated shelf is slightly less than that of the ribs 6 and 7 so that the shelf may freely pass by the upper rib to be placed upon or removed from the lower one.

Lugs 9 may be formed at spaced intervals around the periphery of the perforated shelf and adapted to rest upon either of the annular ribs. These lugs may be formed by providing a bead 10 around the periphery of the perforate shelf and then stretching the bead outward at intervals as at 11, forming lugs or outward extensions of sufficient proportions to engage the peripheral rib as best shown in Fig. 2.

One or more containers for cooking vegetables or the like may be placed upon the shelf 8 or if desired, potatoes or the like may be placed directly thereon for cooking.

A container 12 may also be supported in the upper end of the cooker for cooking additional food. This upper container is supported independently of the shelf.

For this purpose angular ears 13 may be provided upon the container and adapted to rest upon the annular flange 14 of the cooker.

From the above it will be seen that the perforate shelf may be supported upon either of the internal ribs in the cooker and is of such diameter that it will pass freely by the upper rib for engagement with the lower one or removal from the cooker while at the same time the lugs thereon are of such dimensions that the shelf may be securely supported upon either of the ribs.

I claim:

1. A cooking utensil having an internal annular rib, and a shelf of less diameter than the rib, a peripheral bead upon the shelf, and outward extensions formed at intervals upon the bead forming lugs for resting upon the rib.

2. A cooking utensil having spaced, internal annular ribs, and a shelf of less diameter than the ribs, a peripheral bead upon the shelf, and outward extensions formed at intervals upon the bead forming lugs for resting upon either rib.

In testimony that I claim the above, I have hereunto subscribed my name.

KIRK E. PORTER.